(12) United States Patent
Rehfuss

(10) Patent No.: US 8,136,883 B2
(45) Date of Patent: Mar. 20, 2012

(54) VEHICLE SEAT AND VEHICLE WITH A VEHICLE SEAT

(75) Inventor: Benjamin Rehfuss, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 205 days.

(21) Appl. No.: 12/471,806

(22) Filed: May 26, 2009

(65) Prior Publication Data

US 2009/0309402 A1    Dec. 17, 2009

(30) Foreign Application Priority Data

Jun. 13, 2008    (DE) .......................... 10 2008 028 353

(51) Int. Cl.
 *B60N 2/02* (2006.01)
(52) U.S. Cl. ................................. 297/284.9; 297/284.6
(58) Field of Classification Search ............... 297/284.9, 297/284.6
 See application file for complete search history.

(56) References Cited

U.S. PATENT DOCUMENTS

| | | | | |
|---|---|---|---|---|
| 4,589,695 A | * | 5/1986 | Isono | 297/284.9 |
| 5,280,997 A | * | 1/1994 | Andres et al. | 297/284.9 |
| 5,868,466 A | * | 2/1999 | Massara et al. | 297/284.6 |
| 6,129,419 A | * | 10/2000 | Neale | 297/284.6 X |
| 7,216,934 B1 | * | 5/2007 | Kobari | 297/284.9 |
| 7,234,771 B2 | * | 6/2007 | Nakhla | 297/284.9 X |
| 7,607,735 B2 | * | 10/2009 | Kuno et al. | 297/284.6 |
| 7,641,281 B2 | * | 1/2010 | Grimm | 297/284.9 X |
| 7,726,739 B2 | * | 6/2010 | Wain | 297/284.9 |
| 2007/0057551 A1 | | 3/2007 | Lachenmann et al. | |
| 2008/0136237 A1 | | 6/2008 | Kayumi et al. | |
| 2008/0191532 A1 | | 8/2008 | Wain | |

FOREIGN PATENT DOCUMENTS

| | | |
|---|---|---|
| DE | 3718528 A1 | 12/1988 |
| DE | 68904114 T2 | 5/1993 |
| DE | 4441366 C1 | 12/1995 |
| DE | 102006037521 A1 | 5/2007 |
| DE | 102004014881 B4 | 2/2008 |
| EP | 0229737 B1 | 5/1991 |
| GB | 2420272 A | 5/2006 |

OTHER PUBLICATIONS

German Search Report dated Apr. 27, 2009.

* cited by examiner

*Primary Examiner* — Rodney B White

(57) ABSTRACT

A vehicle seat, in particular a motor vehicle seat, has at least one pair of adjustable lateral cheeks provided on a seat cushion and/or on a seat back, with at least one inflatable chamber for adjusting the lateral cheek being provided in each of the lateral cheeks. A plate-shaped element is provided outside the inflatable chamber and on the same side facing a person sitting on the vehicle seat.

8 Claims, 2 Drawing Sheets

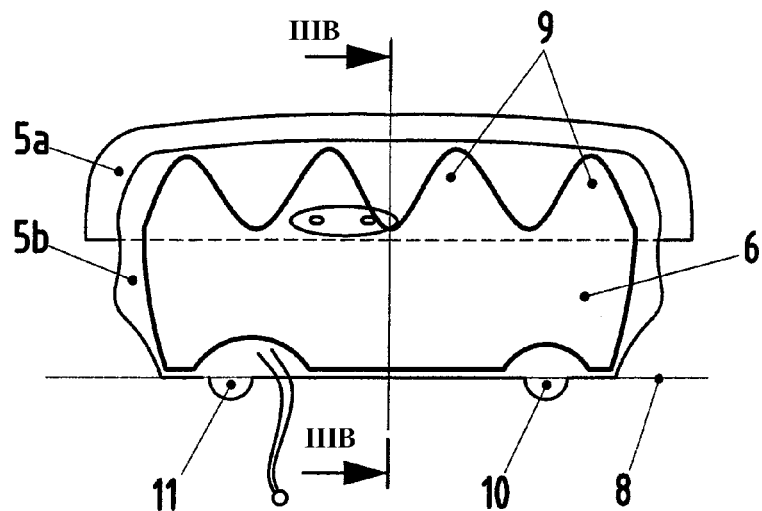
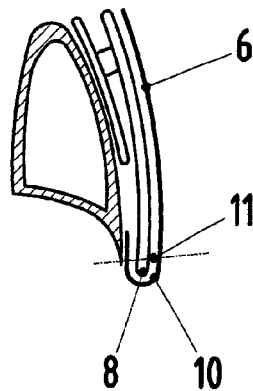
FIG. 3A  FIG. 3B
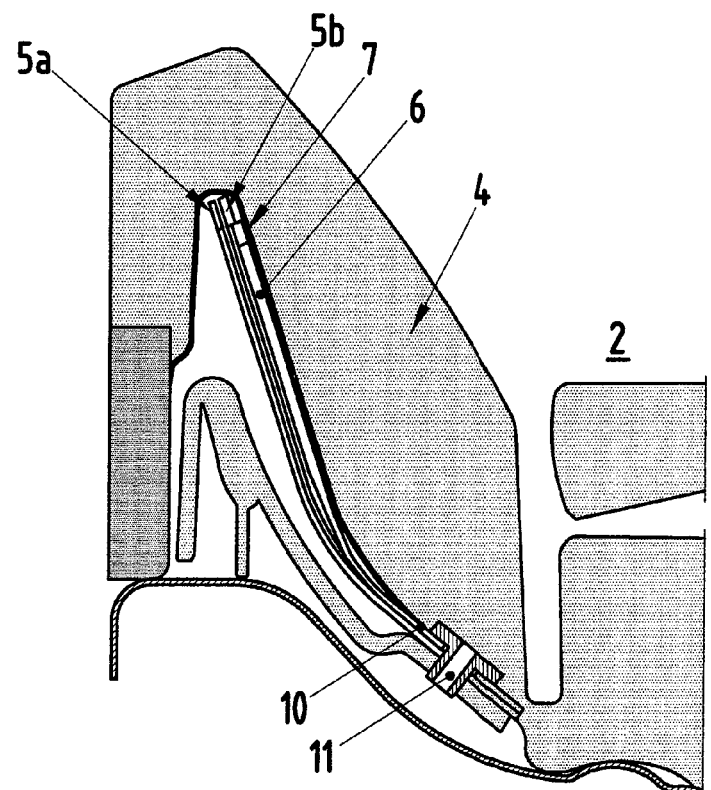
FIG. 4

VEHICLE SEAT AND VEHICLE WITH A VEHICLE SEAT

CROSS-REFERENCE TO RELATED APPLICATION

This application claims the priority, under 35 U.S.C. §119, of German application DE 10 2008 028 353.3, filed Jun. 13, 2008; the prior application is herewith incorporated by reference in its entirety.

BACKGROUND OF THE INVENTION

Field of the Invention

The present invention relates to a vehicle seat, in particular a motor vehicle seat, with at least one pair of adjustable lateral cheeks provided on a seat cushion and/or on a seat back. The invention also relates to a motor vehicle equipped with a vehicle seat of this type.

A vehicle seat of the type in question is known, for example, from German patent DE 10 2004 014 881 B4, corresponding to U.S. patent publication No. 20070057551 A1, wherein at least one chamber unit with an inflatable chamber enclosed by flexible walls is contained in an adjustable lateral cheek. In this case, the chamber unit has two wings which are foldable with respect to each other about a common center axis and are folded up in an empty state of the chamber unit and are unfolded in an inflated state of the same. The chamber unit is intended as a result to be able to be configured as a premanufacturable unit which facilitates the subsequent installation in the vehicle seat.

Published, non-prosecuted German patent application DE 10 2006 037 521 A1 discloses a system for automatically adjusting the contour of a vehicle seat in at least one dimension transversely with respect to the surface thereof. In order to change the contour, the changeable surface has a fluid-fillable and therefore volume-changeable bubble on an outer boundary. In order to be able to achieve a simple and economical construction and a high degree of flexibility in this case, at least two bubbles are provided substantially parallel to each other.

German patent DE 44 41 366 C1 discloses a motor vehicle seat with a back support which contains volume-changeable air chambers and is supported on the rear side on a supporting part which is at least substantially dimensionally stable. In this case, the supporting part has a low pivot axis running in the transverse direction of the vehicle and also a supporting wall connected downstream with the interposition of at least one pressure-changeable air cushion. In the event of a change in volume in the at least one interconnected air cushion, the supporting part is pivoted with the effect of changing the inclination of the body contact surface of the backrest.

Finally, European patent EP 0 229 737 B1 discloses a motor vehicle seat with inflatable lateral seat cheeks. In this case, an inflatable bellows is provided between two flaps which are connected pivotably to each other via a film hinge, with inflation of the bellows causing the two plates which are connected to each other via the film hinge to pivot apart.

SUMMARY OF THE INVENTION

It is accordingly an object of the invention to provide that a vehicle seat and a motor vehicle with a vehicle seat overcomes the above-mentioned disadvantages of the prior art devices of this general type, which is an improved embodiment with which, in particular, the seating comfort is enhanced.

With the foregoing and other objects in view there is provided, in accordance with the invention, a vehicle seat. The vehicle seat contains a seat back, a seat cushion coupled to the seat back, and at least one pair of adjustable lateral cheeks provided on the seat cushion and/or the seat back. The adjustable lateral cheeks each have at least one inflatable chamber for adjusting the adjustable lateral cheeks. The adjustable lateral cheeks each further have a plate-shaped element disposed outside the inflatable chamber and on a side facing a person sitting on the vehicle seat.

The invention is based on the general concept of, in the case of a vehicle seat with lateral cheeks which are adjustable owing to inflatable chambers, providing a plate-shaped element outside the inflatable chamber on the chamber, on a side facing a person sitting on the vehicle seat. The plate-shaped element takes on a pressure distribution function during the inflation of the chamber and, as a result, the lateral cheek is positioned in a planar manner against a thigh or against a lateral back region of a person sitting on the vehicle seat and thereby providing the person with a significantly improved lateral support, in particular during certain driving maneuvers. In the best case, the effect which can be achieved by the opposite lateral cheeks of the vehicle seat, which are preferably inflatable to the same degree, is a C-shaped engagement around the thigh or the back region of the person sitting on the vehicle seat who, owing to the resultant significantly improved lateral support, experiences a significantly enhanced riding comfort. The provision according to the invention of a plate-shaped element substantially increases the seating comfort, since a planar stabilization of the lateral cheeks takes place and pressure zones which are unpleasant to the vehicle occupant upon contact can be avoided.

In an advantageous development of the solution according to the invention, two inflatable chambers are provided per adjustable lateral cheek. In the case of two inflatable chambers, it may furthermore be conceivable for the chambers, for example, to each have a different volume such that, for a fine adjustment, the chamber, for example, having the smaller volume is ventilated or vented while, for rapid adjustment of the lateral cheeks, the comparatively larger chamber is ventilated or vented. The provision of at least two inflatable chambers, preferably each having a different volume, furthermore permits improved engagement around the side areas of the person sitting on the vehicle seat, thus further improving the lateral support. Furthermore, a redundant system can also be created with at least two chambers, and therefore, should one chamber fail, the other chamber is still easily capable of adjusting the lateral cheek to an extent such that a sufficient lateral support can be ensured.

In a further advantageous embodiment of the solution according to the invention, a pocket for at least partially receiving the plate-shaped element is provided on the outside of the inflatable chamber on the side facing the person sitting on the vehicle seat. This enables the plate-shaped element to be positioned particularly simply relative to the inflatable chamber, since the plate-shaped element has simply to be inserted into the receptacle which is arranged on the outer side of the inflatable chamber and is preferably of a pocket-shaped configuration. Such an, in particular pocket-shaped, receptacle ensures exact positioning of the plate-shaped element with respect to the inflatable chamber even over the long term, which is of decisive advantage in particular for highly stressed regions, such as, for example, lateral cheeks of motor vehicle seats. Furthermore, receptacles of this type can be produced cost-effectively and simply and furthermore reduce the need for fastening devices which would be required if the plate-shaped element had to be fastened to the inflatable chamber in a different manner.

The plate-shaped element is expediently mounted rotatably about an axis of rotation and is connected in the region of the axis of rotation via at least one film hinge. Such film hinges permit a smooth-running rotational movement of the plate-shaped element and are furthermore capable of fastening the plate-shaped element to a seat structure. In this case, it is conceivable that at least one of the inflatable chambers is additionally also fastened at the same time in the region. In comparison to other types of hinge, film hinges can be produced extremely cost-effectively and have an extremely long service life in particular in the case of only small angles of rotation, as are the case here.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a vehicle seat and a motor vehicle with the vehicle seat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3A shows a view of the ensemble in FIG. 2 from viewing direction B;

FIG. 3B is a sectional illustration taken along the section line IIIB-IIIB shown in FIG. 3A; and FIG. 4 is a sectional illustration through a lateral cheek according to the invention, but for a different embodiment.

DETAILED DESCRIPTION OF THE INVENTION

Figure 1:
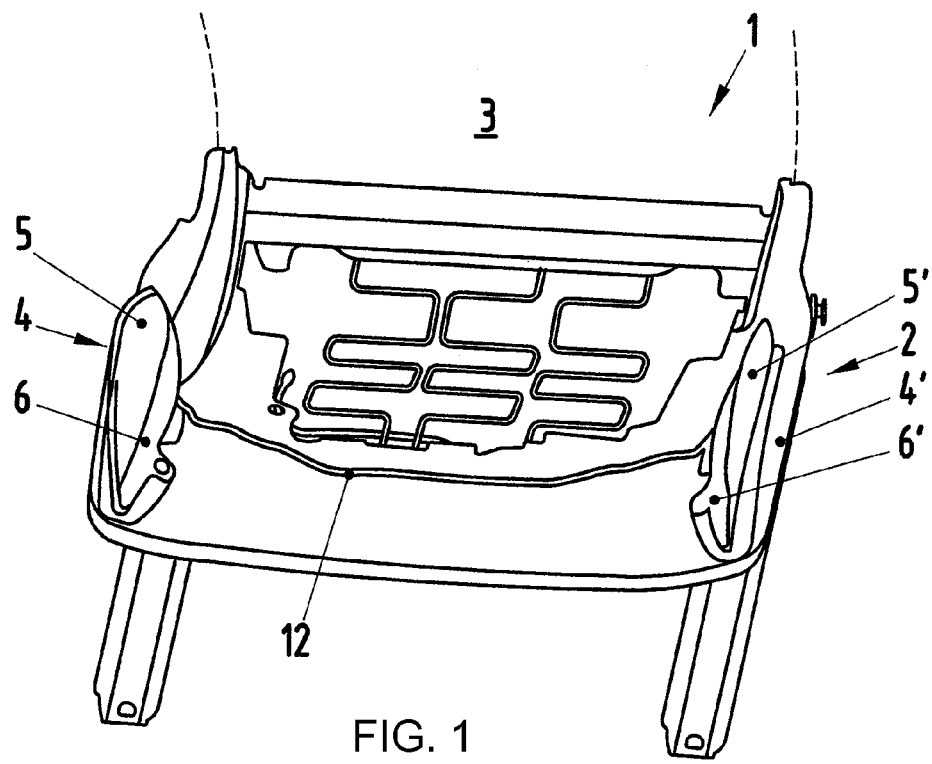
FIG. 1 is a diagrammatic, perspective view of a seat cushion region of a vehicle seat according to the invention.

Referring now to the figures of the drawing in detail and first, particularly, to FIG. 1 thereof, there is shown a vehicle seat 1 according to the invention that has a seat cushion 2 and an adjoining seat back 3 which is customarily adjustable with regard to its inclination. In this case, the seat back 3 is merely indicated by broken lines while the seat cushion 2 of the vehicle seat 1 is illustrated without the actual upholstery. A pair of adjustable lateral cheeks 4 and 4' is provided on the seat cushion 2, the lateral cheeks being able to be adjusted, in particular inflated, in order to improve a lateral support of a person sitting on the vehicle seat 1. Of course, such adjustable lateral cheeks 4 can also be arranged in the region of the seat back 3.

In order to adjust the lateral cheeks 4 and 4', at least one inflatable chamber 5 which can be correspondingly ventilated or vented is provided per lateral cheek. One possible embodiment of such an inflatable chamber 5 is shown, for example, in FIG. 2. A plate-shaped element 6 or 6' is provided outside the respectively inflatable chamber 5 and on the same, on a side facing the person sitting on the vehicle seat 1, the plate-shaped element serving to even out the pressure provided in the inflatable chamber 5 or 5'. The inflation of the chambers 5 and 5' brings about a lateral delimitation of the seat surface of the seat cushion 2 and therefore a boundary of the same and an improved lateral support of a person sitting on the vehicle seat 1. The inflatable chambers 5 can preferably be inflated here steplessly.

Looking at FIGS. 3A, 3B and 4, it can be seen that, in the embodiments shown there, two inflatable chambers 5a and 5b are provided per adjustable lateral cheek 4. This further improves the lateral support of a person sitting on the vehicle seat 1 by the person being embraced or engaged around by the lateral cheek 4 with two inflatable chambers 5a and 5b. In this case, it can be provided that the two inflatable chambers 5a and 5b each have a different or else identical volume. In the example shown, the two chambers 5a and 5b are connected to each other in such a manner that the air volumes in the two chambers 5a, 5b communicate with each other.

For the simplified positioning of the plate-shaped element 6 on the associated inflatable chamber 5, a pocket 7 or a pocket-shaped receptacle 7 serving to at least partially receive the plate-shaped element 6 is provided on the outside of the inflatable chamber 5, according to FIG. 4 on the outside of the inflatable chamber 5b, on the side facing a person sitting on the vehicle seat 1. By this means, in particular the installation of the plate-shaped element 6 on the inflatable chamber 5 can be simplified, since the latter is not fixed in a complicated manner, as previously customary, but rather can be simply inserted into the pocket-like receptacle 7.

Figure 2:
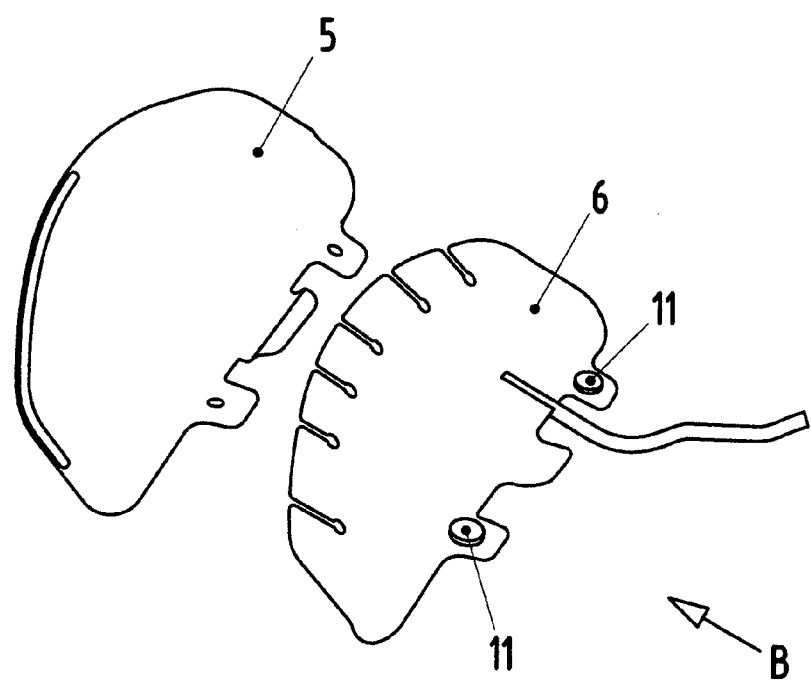
FIG. 2 is an exploded illustration, of an inflatable chamber with a plate-shaped element arranged according to the invention.

In general, the plate-shaped element 6, as shown in particular in FIGS. 2, 3A and 3B, can be configured as a finger plate with fingers 9 pointing away from an axis of rotation 8. The axis of rotation 8 constitutes the axis about which the plate-shaped element 6 is rotated or pivoted during the ventilation or venting of the at least one chamber 5. The rotational movement is brought about here by a film hinge 10 (see. FIG. 3B), wherein the plate-shaped element 6 can additionally be connected in the region of the film hinge 10 to a seat structure, for example to a seat frame. Such film hinges 10 can first be produced extremely cost-effectively and second they have an extremely long service life if the angles of rotation to be covered by the film hinge 10 are limited, as is the case in the present application.

As can be gathered in particular from FIG. 3B, at least one of the inflatable chambers 5, here the chamber 5a, together with the plate-shaped element 6 can be fastened via at least one common fastening point 11 to a non-illustrated seat structure, for example with the aid of a rivet.

The plate-shaped element 6 is generally preferably formed from plastic and, as a result, can first be produced cost-effectively and second is extremely flexible with regard to shaping. If the two opposite lateral cheeks 4 and 4' are to be jointly adjustable, they are customarily connected to each other via a pressure connection 12 (see FIG. 1). However, it is also conceivable that lateral cheeks 4 and 4' which are in each case opposite each other can be adjusted independently of each other.

The effect achieved by the plate-shaped element 6 according to the invention is a planar distribution of pressure, which first brings about a more comfortable seating impression and second provides an improved lateral support of the person sitting on the vehicle seat 1. At the same time, this raises an embracing region, for example for the back or the thighs of the person sitting on the vehicle seat 1, as a result of which a significantly improved lateral support can likewise be obtained. Furthermore, by the receptacle 7 provided on the outside of the at least one inflatable chamber 5, the installation of the inflatable lateral cheek 4 or 4' can be significantly simplified and, as a result, realized more cost-effectively.

The invention claimed is:

1. A vehicle seat, comprising:
  a seat back;
  a seat structure having a seat cushion and coupled to said seat back;
  at least one pair of adjustable lateral cheeks provided on at least one of said seat cushion or said seat back, said adjustable lateral cheeks each having at least one inflatable chamber for adjusting said adjustable lateral cheeks, said adjustable lateral cheeks each further having a plate-shaped element connected to said inflatable chamber and said inflatable chamber disposed on a side facing toward a center of the vehicle seat, said plate-shaped element held so as to be rotatable toward said inflatable chamber;
  a pocket-shaped receptacle for receiving the plate-shaped element, said pocket-shaped receptacle disposed outside on said inflatable chamber;
  fasteners;
  said plate-shaped element having a lower edge with two joint fastening points, said fasteners engaging in said two joint fastening points and attaching said plate-shaped element to said inflatable chamber and to said seat structure;
  at least one film hinge defining an axis of rotation and disposed between said plate-shaped element and said inflatable chamber, said plate-shaped element mounted rotatably about said axis of rotation and connected in a region of said axis of rotation via said at least one film hinge; and
  said plate-shaped element configured as a finger plate with fingers pointing away from said axis of rotation.

2. The vehicle seat according to claim 1, wherein said at least one inflatable chamber is one of two inflatable chambers provided for each of said adjustable lateral cheeks.

3. The vehicle seat according to claim 2, wherein said two inflatable chambers each have a different volume.

4. The vehicle seat according to claim 1, wherein said plate-shaped element is formed from plastic.

5. The vehicle seat according to claim 1, wherein said adjustable lateral cheeks which are in each case are disposed opposite each other can be one of adjusted independently of each other and adjusted jointly.

6. The vehicle seat according to claim 1, wherein the vehicle seat is a motor vehicle seat.

7. A motor vehicle, comprising:
  a vehicle seat, containing:
    a seat back;
    a seat structure having a seat cushion and coupled to said seat back;
    at least one pair of adjustable lateral cheeks provided on at least one of said seat cushion or said seat back, said adjustable lateral cheeks each having at least one inflatable chamber for adjusting said adjustable lateral cheeks, said adjustable lateral cheeks each further having a plate-shaped element connected to said inflatable chamber and said inflatable chamber disposed on a side facing toward a center of the vehicle seat, said plate-shaped element held so as to be rotatable toward said inflatable chamber;
  a pocket-shaped receptacle for receiving the plate-shaped element, said pocket-shaped receptacle disposed outside on said inflatable chamber;
  fasteners:
  said plate-shaped element having a lower edge with two joint fastening points, said fasteners engaging in said two joint fastening points and attaching said plate-shaped element to said inflatable chamber and to said seat structure;
  at least one film hinge defining an axis of rotation and disposed between said plate-shaped element and said inflatable chamber, said plate-shaped element mounted rotatably about said axis of rotation and connected in a region of said axis of rotation via said at least one film hinge; and
  said plate-shaped element configured as a finger plate with fingers pointing away from said axis of rotation.

8. The vehicle seat according to claim 1, wherein said pocket-shaped receptacle completely receives said plate-shaped element and said pocket-shaped receptacle is part of said inflatable chamber.

* * * * *